(12) United States Patent
Tsai

(10) Patent No.: US 9,691,119 B2
(45) Date of Patent: Jun. 27, 2017

(54) RECORDING MEDIUM AND DATA TRANSMISSION SYSTEM

(71) Applicant: Hsiung-Kuang Tsai, Taipei (TW)

(72) Inventor: Hsiung-Kuang Tsai, Taipei (TW)

(73) Assignee: SLIM HMI TECHNOLOGY, Taipei (TW)

( * ) Notice: Subject to any disclaimer, the term of this patent is extended or adjusted under 35 U.S.C. 154(b) by 139 days.

(21) Appl. No.: 14/386,730

(22) PCT Filed: Dec. 20, 2012

(86) PCT No.: PCT/CN2012/086990
§ 371 (c)(1),
(2) Date: Sep. 19, 2014

(87) PCT Pub. No.: WO2013/139155
PCT Pub. Date: Sep. 26, 2013

(65) Prior Publication Data
US 2015/0077423 A1 Mar. 19, 2015

(30) Foreign Application Priority Data
Mar. 21, 2012 (WO) ................ PCT/CN2012/072670

(51) Int. Cl.
*G06T 1/20* (2006.01)
*G06F 3/044* (2006.01)
(Continued)

(52) U.S. Cl.
CPC ................ *G06T 1/20* (2013.01); *G06F 3/044* (2013.01); *G06F 3/046* (2013.01); *G06F 3/0412* (2013.01);
(Continued)

(58) Field of Classification Search
None
See application file for complete search history.

(56) References Cited

U.S. PATENT DOCUMENTS

| 6,492,982 | B1 * | 12/2002 | Matsuzaki | G09G 5/006 345/204 |
| 2010/0053472 | A1 * | 3/2010 | Murai | H04L 12/2814 348/739 |
| 2013/0207939 | A1 * | 8/2013 | Kremin | G06F 3/0383 345/179 |

FOREIGN PATENT DOCUMENTS

| CN | 2727777 Y | * | 9/2005 | ............... G02F 1/13 |
| CN | 101175388 A | | 5/2008 | |
| CN | 101452521 A | | 6/2009 | |

* cited by examiner

*Primary Examiner* — Maurice L McDowell, Jr.
*Assistant Examiner* — Donna J Ricks
(74) *Attorney, Agent, or Firm* — Muncy, Geissler, Olds & Lowe, P.C.

(57) ABSTRACT

A recording medium stores a plurality of commands which are executed by a visual interface apparatus including a display panel and a control unit. The commands comprise controlling the control unit to integrate a display data and a transmission data, and controlling the control unit to transmit the integrated display data and transmission data to the display panel. The commands also include controlling the control unit that the display panel displays an image according to a display data, and controlling the control unit to couple an encoded signal containing the transmission data to an operation apparatus through an electrode of the display panel. A data transmission system is also disclosed in the invention. Thus, the wireless transmission function can be achieved by the display panel without the need of adding other components and the application of the electronic apparatus can be thus expanded.

15 Claims, 3 Drawing Sheets

(51) Int. Cl.
  *G06F 3/041* (2006.01)
  *G06F 3/046* (2006.01)
  *G09G 3/20* (2006.01)
  *G09G 5/12* (2006.01)
  *G06F 3/147* (2006.01)
  *G09G 5/18* (2006.01)
  *G09F 9/00* (2006.01)
  *G09G 3/36* (2006.01)
  *G09G 3/32* (2016.01)
  *G09G 3/04* (2006.01)
  G09G 3/3225 (2016.01)

(52) U.S. Cl.
  CPC .............. *G06F 3/147* (2013.01); *G09F 9/00* (2013.01); *G09G 3/20* (2013.01); *G09G 5/12* (2013.01); *G09G 5/18* (2013.01); *G09G 3/04* (2013.01); *G09G 3/3225* (2013.01); *G09G 3/3648* (2013.01); *G09G 2354/00* (2013.01); *G09G 2370/06* (2013.01); *G09G 2370/16* (2013.01)

RECORDING MEDIUM AND DATA TRANSMISSION SYSTEM

BACKGROUND OF THE INVENTION

Field of Invention

The invention relates to a recording medium and a data transmission system.

Related Art

In recent years, for expanding the application of the consumer electronics, some companies start to introduce the near field communication (or short range wireless communication) technology in the electronic products. The near field communication (or short range wireless communication) technology can allow the transmission of such as command, music, picture, business card, data or file from an electronic apparatus to another electronic apparatus without establishing a physical circuit connection. This not only provides a convenient way of data transmission for the electronic apparatus but also expand their applications, for example, to replace the occasions requiring IC cards, such as access control, tickets, credit cards. Or in the occasion of receiving advertising information, such like using Bluetooth to receive the coupon from a screen in the market.

It is an expectable trend for the electronic product to equip with near field communication function. Therefore, it is an active subject for people to develop a new architecture of electronic apparatus with near field communication function.

SUMMARY OF THE INVENTION

An object of the invention is to provide a recording medium and a data transmission system including the recording medium. Such that the system can process the display data and the transmission data and then send those to the display panel of a visual interface apparatus. Thus, the display panel of the visual interface apparatus not only can display images, but also can transmit data, such as data or file, to another electronic apparatus. Thereby, the wireless transmission function can be achieved by the display panel without the need of adding other components, and the applications of the electronic apparatus can be thus expanded.

A recording medium of the invention stores a plurality of commands which are executed by a visual interface apparatus including a display panel and a control unit. The commands comprise controlling the control unit to integrate a display data and a transmission data, and controlling the control unit to transmit the integrated display data and transmission data to the display panel.

In one embodiment, the integration of the control unit includes adding at least a label into the display data or the transmission data.

A recording medium of the invention stores a plurality of commands which are executed by a visual interface apparatus including a display panel and a control unit. The commands include: controlling the control unit to display an image on the display panel according to a display data; and controlling the control unit to couple an encoded signal containing a transmission data to an operation apparatus from an electrode of the display panel.

In one embodiment, the recording medium is a component within the visual interface apparatus or a separate appliance.

In one embodiment, the recording medium is a memory, a memory card, an optical disc, a video tape, a computer magnetic tape, or their any combination.

In one embodiment, the electrode is a separate electrode of the display panel or at least one of plural column or row electrodes of a pixel matrix of the display panel.

In one embodiment, when an operation apparatus operates on a display surface of the display panel, the commands control the transmission of the encoded signal from the separate electrode or the column or row electrode to the operation apparatus.

A data transmission system of the invention comprises a visual interface apparatus, an operation apparatus and a recording medium. The visual interface apparatus includes a display panel and a control unit. The recording medium stores a plurality of commands. The commands include controlling the control unit to couple an encoded signal containing a transmission data to the operation apparatus through an electrode of the display panel when the operation apparatus operates on a display surface of the visual interface apparatus.

As mentioned above, in the invention of recording medium and the data transmission system including the recording medium, the visual interface apparatus includes a display panel and a control unit, and the recording medium stores multiple commands. When the operation apparatus operates on a display surface of the visual interface apparatus, the commands include controlling the control unit to integrate a display data and a transmission data and controlling the control unit to transmit the integrated display data and transmission data to the display panel. Besides, the commands also include controlling the control unit to couple an encoded signal containing the transmission data to the operation apparatus through an electrode of the display panel. Thereby, the display panel of the visual interface apparatus not only can display images, but also the transmission data such as data or file can be transmitted to another electronic apparatus from the display panel of the visual interface apparatus. Thus, the wireless transmission function can be achieved by the display panel without the need of adding other components, and the applications of the electronic apparatus can be thus expanded.

DETAILED DESCRIPTION OF THE INVENTION

In the following, a preferred embodiment of a recording medium and a data transmission system of present invention will be described with reference to the accompanying drawings, wherein the same references relates to the same elements.

Figure 1A:
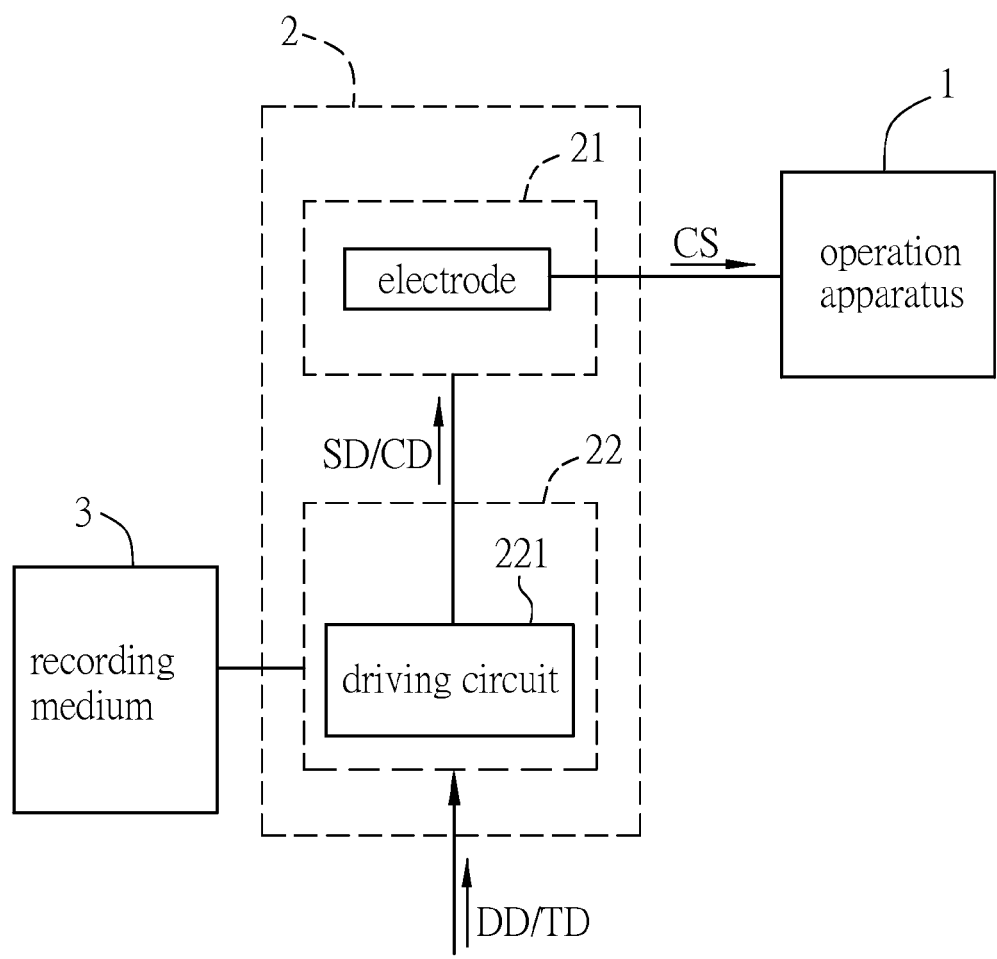
FIG. 1A is a schematic functional block diagram of a data transmission system according to a preferred embodiment of the invention.

FIG. 1A is a schematic functional block diagram of a data transmission system according to a preferred embodiment of the invention.

As shown in FIG. 1A, the data transmission system includes an operation apparatus 1, a visual interface apparatus 2 and a recording medium 3. The operation apparatus 1 and the visual interface apparatus 2 are coupled to each other, for example, by the coupling of electromagnetic effects (such as capacitance or inductance), and thereby the data or file can be transmitted. Therefore, it's a kind of data or file transmission without connecting a wire, and can be called a wireless transmission of data or file.

The operation apparatus 1 can be, for example, a receiving apparatus (such as a card reader or an access control system), an IC card, a cell phone, a public information apparatus, a point of sales (POS) apparatus, another electronic apparatus having a visual interface display, or an electronic apparatus capable of executing various functions. The visual interface apparatus 2 can include, for example, another cell phone, or a computer (such as tablet computer, notebook computer), or another public display, or a billboard, or an electronic whiteboard, or a personal digital assistant (PDA), or their any combination, which is not limited in this invention. Moreover, the operation apparatus 1 and the visual interface apparatus 2 can both include functional sub-systems, such as system for controlling the process, system for data storage or system for data transmission. Herein, the said system can be constituted of hardware, software, firmware or their any combination.

The visual interface apparatus 2 includes a display panel 21 and a control unit 22. The display panel 21 and the control unit 22 can be integrated into a single apparatus body (such as a smart phone or a tablet computer), or the display panel 21 and the control unit 22 can be disposed separately in the apparatuses body (such as a personal computer or a notebook computer). The control unit 22 can include the key control assembly of the visual interface apparatus 2, and for example, can include at least a central processing unit (CPU) and a memory, or other control hardware, software or firmware. Moreover, the control unit 22 of the invention also can include a driving circuit 221 for driving the display panel 21. The driving circuit 221 can be integrated on the display panel 21 (e.g. by chip on glass or driver integrated on the glass), or disposed outside the display panel (e.g. by the connection of conductive wires, TCP, or COF).

The display panel 21 can have a pixel matrix with multiple dimensions, such as an active matrix or a passive matrix. Otherwise, the display panel 21 can have a single-dimension pixel array, such as a segment type or a direct drive dot matrix display (for example, a seven-segment display screen, or electronic label), or can be a single pixel electrode (such as a the bright ON mark to show the status of a switch button). Herein, the active matrix is the matrix on the matrix substrate of, for example, an LCD panel, OLED panel, LED panel, electrophoretic display panel, touch display panel, or MEMS display panel. In this embodiment, the display panel 21 is illustrated with an active matrix LCD panel as an example. The display panel 21 includes a plurality of column electrodes, a plurality of row electrodes and a plurality of pixel electrodes, and the column electrodes and the row electrodes can cross each other (not shown). Moreover, the display panel 21 can further include a plurality of transistors (not shown), which are electrically connected with the column electrodes, the row electrodes and the pixel electrodes. Herein for example, the row electrodes are a plurality of scan lines and the column electrodes are a plurality of data lines. Of course, the row electrodes can be a plurality of data lines and the column electrodes can be a plurality of scan lines. The driving circuit 221 can include a data driving circuit (data driver) and a scan driving circuit (scan driver), and both of their timing controls are generated by a timing control circuit (not shown). The scan driver is electrically connected with the scan lines of the display panel 21, and the data driver is electrically connected with the data lines of the display panel 21. The timing control circuit can convert the scan and display data signals received from the interface into the signals of the image displayed by the display panel, and can generate the clocks and synchronization signals required for the scan driver and the data driver.

Figure 1B:
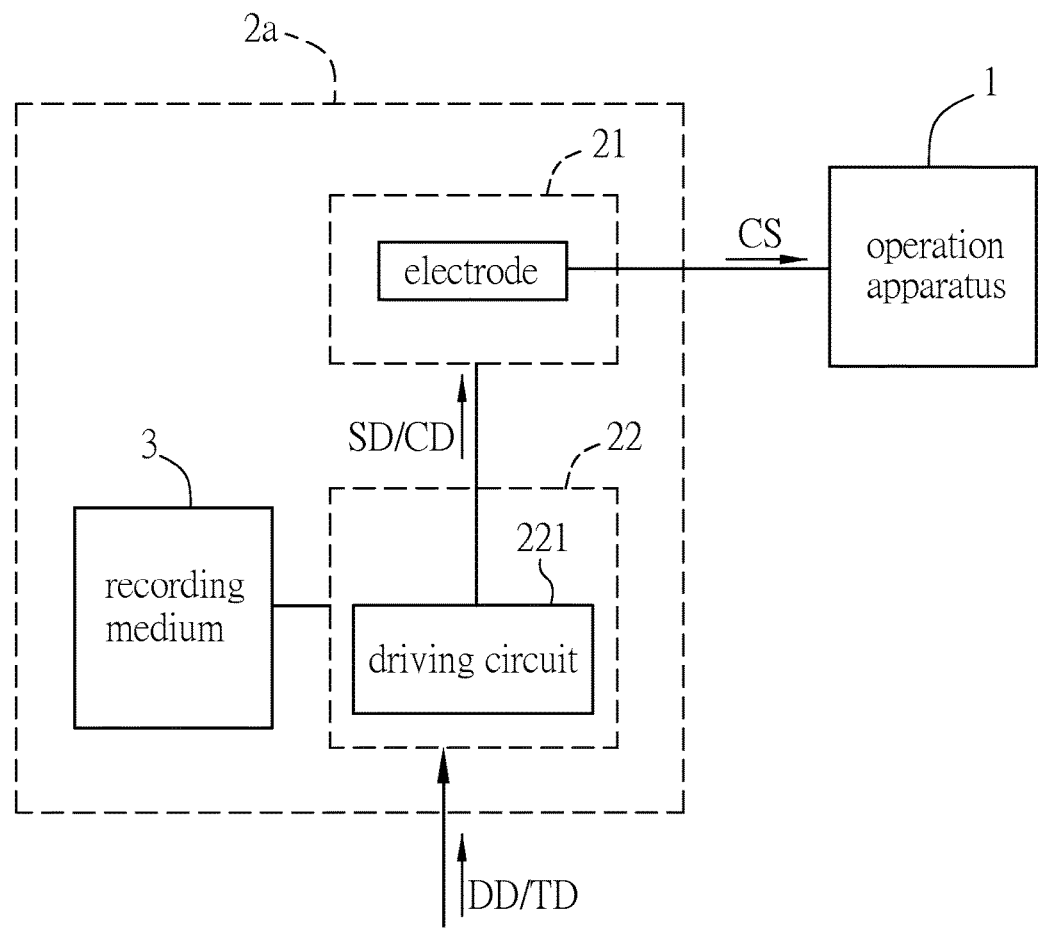
FIG. 1B is a schematic functional block diagram of another data transmission system according to a preferred embodiment of the invention.

The recording medium 3 stores a plurality of commands, which can be executed by the visual interface apparatus 2. The recording medium 3 can be, for example, a memory, a memory card, an optical disc, a video tape, a computer magnetic tape, or their any combination, for storing procedures or commands. The memory can include a ROM, a RAM, a Flash memory, a field-programmable gate array (FPGA), or other types of memory. The recording medium 3 can be an internal component of the visual interface apparatus 2 (such as the memory inside the visual interface apparatus 2 but separate from the control unit 22, or an internal memory of the control unit 22), or an isolated appliance separate from the visual interface apparatus 2 (such as a cloud data center), which can connect with the visual interface apparatus 2 through wires (e.g. local area network), wireless (e.g. Wi-Fi, Bluetooth or radio frequency) or other physical or non-physical connection. In this embodiment, the recording medium 3 is an isolated appliance separate from the visual interface apparatus 2, and the multiple commands stored in the recording medium 3 can be accessed by the visual interface apparatus 2. However, in another embodiment, as shown in FIG. 1B, the recording medium 3 can be a memory that is an internal component of the visual interface apparatus 2a and separate from the control unit 22. Or, in another embodiment, the recording medium 3 can be an internal memory (not shown) of the control unit 22. This invention is not limited thereto.

When the visual interface apparatus 2 or 2a needs to transmit the data, the visual interface apparatus 2 or 2a can load the multiple commands stored in the recording medium 3 and thereby control the data transmission process. When the commands are loaded, the commands can include, at least, the processes of controlling the visual interface apparatus 2 or 2a to implement the data generation and the data transmission.

FIG. 1A is taken as an example to illustrate the process of the data generation and data transmission as below.

During the data generation, the commands can control the control unit 22 to integrate a display data DD and a transmission data TD. Moreover, the commands also can control the control unit 22 to transmit the integrated display data DD and transmission data TD to the display panel 21. The display data DD and the transmission data TD can be generated by the visual interface apparatus 2 or obtained from an external apparatus by transmission, or their combinations. Otherwise, the display data DD and the transmission data TD can come from the recording medium 3. This invention is not limited thereto.

To describe in detail, through the commands, the control unit 22 can combine the display data DD and the transmission data TD into a data and transmit the data to the driving circuit 221. The way of transmitting the data can go through one signal bus that connecting the control unit and driving circuit and in juxtaposition (i.e. the display data DD and the transmission data TD use separate bus lines of the signal bus), or by time sharing (i.e. the display data DD and the transmission data TD share the same bus lines of the signal bus), or through different buses.

After receiving and processing the display data DD and the transmission data TD, the driving circuit 221 then transmits a screen data SD and a coupling data CD to the display panel 21. The screen data SD and the coupling data CD can contain the information from the display data DD and the transmission data TD, respectively. Moreover, the processing of the driving circuit 221 can include, for example, series-to-parallel conversion, encoding, encryption, adding a header (containing data size, check code, serial number, tracking data), a transmission starting label and/or ending label. Herein, the display data DD can be a gray level data of an image frame of the display panel 21, and the transmission data TD can be a digital data stream or digital file stream and can be a touch information, command information, identification information, transaction information, advertisement information, promotion information, file information or other kinds of information. The foregoing screen data SD and the coupling data CD only represent that two kinds of data for different purposes are transmitted to the display panel 21 but do not represent the signals. By taking an LCD panel as an example, the screen data SD represents, including, the scan signal (for Y-direction driving) and the data signal (for X-direction driving), and the coupling data CD can represent a separate scan signal or data signal, or the scan signal in the screen data SD, or the data signal in the screen data SD, etc.

The way of the control unit 22 to integrate the data can include, for example, adding at least a label into the display data DD and/or the transmission data TD in order to tag the display data DD and/or the transmission data TD. In other words, in order that the driving unit 221 can identify the display data DD as the screen data SD for the display and the transmission data TD as the coupling data CD for the transmission, the command can control the control unit 22 to generate different labels including at least a control signal or at least a formatted tag for data and add them to the display data DD and the transmission data TD, and therefore the driving circuit 221 can distinguish the input data as either the screen data SD for the display or the coupling data CD for the coupling.

During the data transmission, the commands can control the control unit 22 so that the display panel 21 can display an image based on the display data DD. Moreover, the commands also can control the control unit 22 to transmit an encoded signal CS containing the transmission data TD to an electrode of the display panel 21, and the operation apparatus 1 can couple this signal by approaching the display panel 21. Herein, the sequence of the display panel 21 displaying the image and coupling the encoded signal CS to the operation apparatus 1 can be reversed, or they can happen at the same time. After the driving circuit 221 identifies the input data as either the screen data SD for display or the coupling data CD for coupling, the driving circuit 221 can output the screen data SD according to the display data DD so that the display panel 21 can display at least a part of an image frame. Or, the driving circuit 221 can output, according to the transmission data TD, the coupling data CD that will be coupled to the operation apparatus 1 through at least an electrode of the display panel 21. To be more details, when the operation apparatus 1 operates on a display surface of the display panel 21, the commands can control the control unit 22 to couple the encoded signal CS that contains the transmission data (i.e. the coupling data CD), from an electrode of the display panel 21 to the operation apparatus 1. Herein, the operation of the operation apparatus 1 on the display surface of the display panel 21 means the activity that the operation apparatus 1 approaches or contacts the display surface of the display panel 21. Moreover, the electrode of the display panel 21 can be a separate electrode (can be one or multiple electrodes) and located outside the pixel matrix of the display panel 21, or can be at least one of the column or row electrodes of the pixel matrix of the display panel 21. Besides, the commands can control the encoded signal CS to be transmitted from the separate electrode, column electrode or row electrode of the display panel 21 to the operation apparatus 1 and be received by the operation apparatus 1.

To be noted, the command can control the control unit 22 to discriminate the display data DD and the transmission data TD by using the control signal or the data label or they can be identified by the time position as well. For example, the commands can control the control unit 22 to transmit the display data DD and the transmission data TD to the driving circuit 221 regularly at different time positions, respectively (e.g. different time positions relative to the screen synchronization signal). The difference in time position can be used to identify the display data DD and the transmission data TD. For example, a protocol can be established between the control unit 22 and the driving circuit 221 as following: the display data DD is transmitted from the start of an image frame till the end of last scan line (the first time), and the transmission data TD is transmitted starting from the end of the last scan line till the beginning of the next image frame (the second time); or within the scanning time of each scan line, first transmit the transmission data TD (the first time) and then the display data DD (the second time). Thereby, the driving circuit 221 can thus identify which is the screen data SD for the display image and which is the coupling data CD to be transmitted to the operation apparatus 1.

Figure 2:
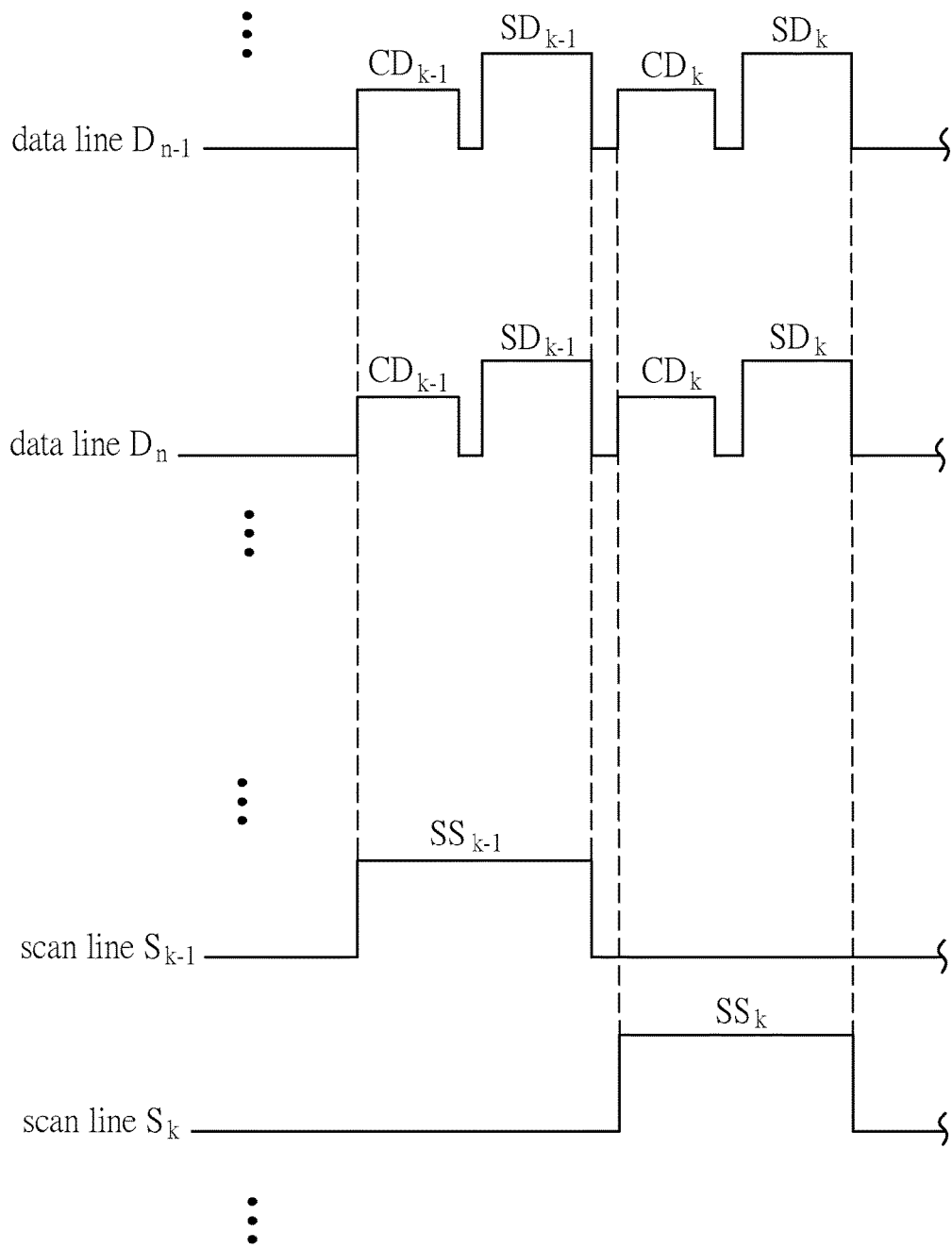
FIG. 2 is a schematic signal diagram of the two adjacent scan lines (column electrodes) and two adjacent data lines (row electrodes) in an LCD panel.

FIG. 2 is a schematic diagram showing the signals of the two adjacent scan lines (row electrodes) and two adjacent data lines (column electrodes) in an LCD panel. Herein, the example is provided to transmit a part of the coupling data CD when each row of the transistors is turned on for displaying. To be noted, it is not required to turn on the transistors for transmitting the coupling data. The coupling data can be transmitted when the transistors are turned off and, in this case, the coupling data is transmitted from the data lines or scan lines. The scan lines can transmit the scan signal to turn on each row of the transistors sequentially, and when each row of the transistors is turned on, the data lines can transmit a part of the coupling data CD and the screen data SD.

In this embodiment, when the scan line $S_{k-1}$ transmits the scan signal $SS_{k-1}$, all the data lines $D_n$ transmit a part of the coupling data $CD_{k-1}$. When the scan line $S_k$ transmits the scan signal $SS_k$, all the data lines $D_n$ transmit a part of the coupling data $CD_k$. The parts of the coupling data $CD_{k-1}$, $CD_k$ are shown as different voltage levels with respect to the screen data $SD_{k-1}$, $SD_k$ in FIG. 2. However, they may have the same voltage level in other embodiments. Therefore, when the scan lines transmit the scan signal, the data lines can transmit the coupling data CD so that at least a part of the coupling data CD can be coupled to the operation apparatus 1.

To be noted, a part of the coupling data $CD_k$, $CD_{k-1}$ in FIG. 2 is shown as a high level of "1", but it is just for illustrative purpose, and certainly the low level of "0" also can be used. Moreover, in order to avoid the polarity issue, the signal of the coupling data $CD_k$, $CD_{k-1}$ can be an AC signal without DC component. Moreover, the coupling data $CD_k$, $CD_{k-1}$ may contain single bit or multiple bits, respectively, and are not limited in this invention. Although all the data lines in FIG. 2 transmit the same coupling data $CD_k$, $CD_{k-1}$ within the same frame time, each of the data lines also can transmit different coupling data. Moreover, several data lines can be grouped to transmit the same coupling data. For example, the data lines $D_1$~$D_3$ transmit the first part of the coupling data $CD_1$, and the data lines $D_4$~$D_6$ transmit the second part of the coupling data $CD_2$. The same principle also can be applied to the coupling data transmitted by the scan lines. Besides, to assure the correct transmission of coupling data CD, the same coupling data CD can be re-transmitted at different times. In other words, in case of abnormality, the same coupling data CD can be transmitted again in order to assure correct data being received by the operation apparatus 1.

The above is the amplitude modulation technique which uses high/low amplitude to represent "1" or "0". However, the frequency modulation technique also can be used to express "1" or "0". For example, defines 5 cycles of high-low change in amplitude within a unit time as "1" and the rest as "0". Otherwise, the phase shift modulation can be used, which, for example, defines a high level to a low level as "0" and a low level to a high level as "1". The type of the modulation technique is not limited herein. Moreover, in order to avoid the interference between the adjacent electrodes, the time-division multiplexing, frequency-division multiplexing, or code-division multiplexing can be used for different electrodes.

Accordingly, when the user takes and operates the operation apparatus 1 on the display panel 21 of the visual interface apparatus 2 (such as contacting the display panel 21), the commands can govern the control unit 22 to transmit the encoded signal CS containing the transmission data TD (i.e. the coupling data CD), so that the signal can be coupled to the operation apparatus 1 from the electrode of the display panel 21. Because the coupling data CD is transmitted by the data line in this embodiment, the data line acts as one of the electrodes in the capacitive coupling while another electrode in the capacitive coupling locates in the operation apparatus 1. After the operation apparatus 1 receives the entire encoded signal CS through the capacitive coupling, the operation apparatus 1 can retrieve the transmission data TD from the encoded signal CS. For example, when the operation apparatus 1 is an access control unit, by approaching the display surface of the visual interface apparatus 2 to the operation apparatus 1, the operation apparatus 1 can receive the identification message transmitted by the visual interface apparatus 2, and thereby the lock can be removed or applied. When the visual interface apparatus 2 is a public display and the operation apparatus 1 is a cell phone or another personal apparatus, by moving the operation apparatus 1 close to the display surface of the visual interface apparatus 2, the information such as advertising information, promotion information, geographical information, can be transmitted to the personal apparatus. Besides, in another application, where the visual interface apparatus 1 is an electronic label (E-tag), the operation apparatus 1 is a hand-held device (such as cell phone) and the recording medium 3 is a cloud data center, the products represented by the E-tag can be transmitted to the hand-held device through the commands stored in the cloud data center. Then, the user takes the hand-held device to the cash register (now, the hand-held device is a visual interface apparatus and the cash register is an operation apparatus) and uploads the shopping list in the hand-held device to the sales system of the store for settling accounts and payment.

In summary, the recording medium and the data transmission system including the recording medium of the invention include, a visual interface apparatus includes a display panel and a control unit, and a recording medium stores multiple commands. When an operation apparatus operates on a display surface of the visual interface apparatus, the commands include governing the control unit to integrate a display data and a transmission data and governing the control unit to transmit the integrated display data and transmission data to the display panel. Besides, the commands also include governing the control unit to transmit an encoded signal, containing the transmission data and to be coupled to the operation apparatus through an electrode of the display panel. Thereby, the display panel of the visual interface apparatus not only can display images, but also can transmit the transmission data such as data or file to another electronic apparatus. Thus, the transmission function of wireless connection can be achieved by the display panel without adding other components, and the application of the electronic apparatus can be thus expanded.

Although the invention has been described with reference to specific embodiments, this is not meant to confine the invention to the specific examples. Various modifications of the disclosed embodiments, as well as alternative embodiments, not apart from the essence of this invention should fall within the scope of the appended claims.

What is claimed is:

1. A non-transitory tangible recording medium storing a plurality of commands which are executed by a controller of a visual interface apparatus including a display panel and a driving circuit, the commands comprising:
    controlling the controller to integrate a display data and a transmission data; and
    controlling the driving circuit to transmit the integrated display data and transmission data to at least one display electrode of the display panel, wherein the display electrode of the display panel is configured to display an image based on the display data and to transmit the transmission data wirelessly to an operation apparatus, wherein the display electrode is at least one of the plural column or row electrodes of a pixel matrix for display with multiple dimension of the display panel, or is at least one of the display electrode of a single dimension array for display of the display panel, or is a display electrode of a single pixel for display of the display panel.

2. The recording medium as recited in claim 1, wherein the integration of the controller includes tagging the display data or the transmission data with at least one label.

3. The recording medium as recited in claim 1, wherein the recording medium is an internal component of the visual interface apparatus or an appliance separate from the visual interface apparatus.

4. The recording medium as recited in claim 1, wherein the recording medium is a memory, a memory card, an optical disc, a video tape, a computer magnetic tape, or their any combination.

5. A non-transitory tangible recording medium storing a plurality of commands which are executed by a controller of a visual interface apparatus including a display panel and a driving circuit, the commands comprising:
    controlling the controller that the display panel displays an image according to a display data; and
    controlling the driving circuit to transmit an encoded signal containing a transmission data to an operation apparatus through a display electrode of the display panel, wherein the display electrode of the display panel is configured to display an image based on a display data and to transmit the transmission data wirelessly to an operation apparatus, wherein the display electrode is at least one of the plural column or row electrodes of a pixel matrix for display with multiple dimension of the display panel, or is at least one of the display electrode of a single dimension array for display of the display panel, or is a display electrode of a single pixel for display of the display panel.

6. The recording medium as recited in claim 5, wherein the recording medium is an internal component of the visual interface apparatus or an appliance separate from the visual interface apparatus.

7. The recording medium as recited in claim 5, wherein the recording medium is a memory, a memory card, an optical disc, a video tape, a computer magnetic tape, or their any combination.

8. The recording medium as recited in claim 5, wherein when the operation apparatus operates on a display surface of the display panel, the commands control the transmission of an encoded signal from the display electrode to the operation apparatus.

9. A data transmission system, comprising:
a visual interface apparatus including a display panel, a controller and a driving circuit;
an operation apparatus; and
a recording medium storing a plurality of commands,
wherein the commands are executed by the controller to control the driving circuit to transmit an encoded signal containing a transmission data wirelessly to the operation apparatus through a display electrode of the display panel when the operation apparatus operates on a display surface of the visual interface apparatus, wherein the display electrode is configured to display an image based on a display data, wherein the display electrode is at least one of the plural column or row electrodes of a pixel matrix for display with multiple dimension of the display panel, or is at least one of the display electrode of a single dimension array for display of the display panel, or is a display electrode of a single pixel for display of the display panel.

10. The data transmission system as recited in claim 9, wherein the commands also include controlling the controller to integrate a display data and the transmission data.

11. The data transmission system as recited in claim 10, wherein the commands also include controlling the driving circuit to transmit the integrated display data and transmission data to the display panel.

12. The data transmission system as recited in claim 10, wherein the integration by the controller includes tagging the display data or the transmission data with at least one label.

13. The data transmission system as recited in claim 9, wherein the recording medium is an internal component of the visual interface apparatus or an appliance separate from the visual interface apparatus.

14. The data transmission system as recited in claim 9, wherein the recording medium is a memory, a memory card, an optical disc, a video tape, a computer magnetic tape, or their any combination.

15. The data transmission system as recited in claim 9, wherein the commands control that the transmission of an encoded signal from the display electrode to the operation apparatus.

* * * * *